US011423352B2

(12) United States Patent
Wan et al.

(10) Patent No.: US 11,423,352 B2
(45) Date of Patent: Aug. 23, 2022

(54) SYSTEMS AND METHODS FOR DISTRIBUTED LEDGER-BASED FLOORPLANNING

(71) Applicant: JPMorgan Chase Bank, N.A., New York, NY (US)

(72) Inventors: Tiffany Ashley Wan, New York, NY (US); Andrew M. Dresner, Larchmont, NY (US); Kevin P. Point, Chicago, IL (US); Jason Zehr, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 147 days.

(21) Appl. No.: 15/973,875

(22) Filed: May 8, 2018

(65) Prior Publication Data

US 2019/0347605 A1 Nov. 14, 2019

(51) Int. Cl.
| | | |
|---|---|---|
| *G06Q 10/08* | (2012.01) | |
| *G06Q 40/08* | (2012.01) | |
| *G06Q 20/10* | (2012.01) | |
| *G06F 16/27* | (2019.01) | |

(52) U.S. Cl.
CPC ......... *G06Q 10/087* (2013.01); *G06Q 20/102* (2013.01); *G06Q 40/08* (2013.01); *G06F 16/27* (2019.01)

(58) Field of Classification Search
CPC . G06Q 30/0609; G06Q 30/08; G06Q 2220/00
See application file for complete search history.

(56) References Cited

U.S. PATENT DOCUMENTS

| | | | |
|---|---|---|---|
| 7,774,268 B2 | 8/2010 | Bradley | |
| 10,521,780 B1 * | 12/2019 | Hopkins, III | .......... G06Q 20/10 |
| 2017/0046652 A1 * | 2/2017 | Haldenby | ............. H04L 9/0816 |
| 2017/0243193 A1 * | 8/2017 | Manian | ............. G06Q 20/3829 |
| 2017/0353309 A1 | 12/2017 | Gray | |
| 2018/0018723 A1 * | 1/2018 | Nagla | ................... H04L 9/3236 |

(Continued)

FOREIGN PATENT DOCUMENTS

WO    WO-2018163044 A1 *  9/2018  ......... G06F 16/2315

OTHER PUBLICATIONS

Angwei Law, Smart Contracts and their Application in Supply Chain Management, MIT Library Archives, Dec. 7, 2017, entire document pertinent (Year: 2017).*

(Continued)

*Primary Examiner* — Gregory S Cunningham, II
(74) *Attorney, Agent, or Firm* — Greenberg Traurig LLP

(57) ABSTRACT

System and methods for distributed ledger-based floorplanning are disclosed. According to one embodiment, in an information processing device comprising at least one computer processor and a distributed ledger system, a method for distributed ledger-based floorplanning may include: (1) receiving, at the distributed ledger system, an identifier for a trackable resource and resource status data for the trackable resource; (2) writing the identifier and the resource status data to a distributed ledger; (3) receiving, at the distributed ledger, an update to the resource status data for the trackable resource; (4) writing the update to the distributed ledger; and (5) executing a smart contract based on the update to the resource status data.

15 Claims, 2 Drawing Sheets

(56) References Cited

U.S. PATENT DOCUMENTS

2018/0143995 A1* 5/2018 Bailey .................... G06F 21/64
2019/0295030 A1* 9/2019 Candeloro, Jr ......... G06F 9/547

OTHER PUBLICATIONS

International Search Report, dated Jul. 29, 2019, from corresponding International Application No. PCT/US2019/031063.
Written Opinion of the International Searching Authority, dated Jul. 29, 2019, from corresponding International Application No. PCT/US2019/031063.

* cited by examiner

SYSTEMS AND METHODS FOR DISTRIBUTED LEDGER-BASED FLOORPLANNING

BACKGROUND OF THE INVENTION

1. Field of the Invention

The present disclosure generally relates to systems and methods for distributed ledger-based floorplanning.

2. Description of the Related Art

Today, floorplanning is a manual and complex process. There are generally multiple bilateral agreements between original equipment manufacturers (OEMs), dealers, and multiple bilateral arrangements between OEMs, dealers, and lenders. There is no real-time data on inventory status (e.g., for a vehicle—ownership status, amount financed, condition, collateral position, etc.), so physical audits are often required to reconcile a dealer's line of credit with its inventory to ensure that its inventory is not sold out of policy or trust. The parties involved—the OEMs, dealers, and lenders—often have misaligned interests.

SUMMARY OF THE INVENTION

System and methods for distributed ledger-based floorplanning are disclosed. According to one embodiment, in an information processing device comprising at least one computer processor and a distributed ledger system, a method for distributed ledger-based floorplanning may include: (1) receiving, at the distributed ledger system, an identifier for a trackable resource and resource status data for the trackable resource; (2) writing the identifier and the resource status data to a distributed ledger; (3) receiving, at the distributed ledger, an update to the resource status data for the trackable resource; (4) writing the update to the distributed ledger; and (5) executing a smart contract based on the update to the resource status data.

In one embodiment, the resource status data or the update to the resource status data may be received from a supplier of the trackable resource.

In one embodiment, the resource status data or the update to the resource status data may be received by a dealer or seller of the trackable resource.

In one embodiment, the resource status data or the update to the resource status data may be received from an onboard system for the trackable resource.

In one embodiment, the resource status data or the update to the resource status data may be received from a telematics provider for the trackable resource.

In one embodiment, the resource status data or the update to the resource status data may be received from a sensor at a location for a dealer or seller of the trackable resource.

In one embodiment, the trackable resource may be a vehicle, and the identifier may include a vehicle identification number.

In one embodiment, the resource status data may include a mileage of the vehicle, a maintenance status of the vehicle, or a sales status of the vehicle (e.g., in-transit, unsold, sold, service loaner, demonstrator, rental car, etc.).

In one embodiment, the smart contract may execute a payment from a dealer or seller of the trackable resource to a supplier of the trackable resource.

In one embodiment, the smart contract may execute a payment from a financier of the trackable resource to a supplier of the trackable resource.

In one embodiment, the smart contract may execute a payment from a dealer or seller of the trackable resource to the financier of the trackable resource. This may be, for example, for repayment of the floorplan loan and/or interest, collection of curtailments, etc.

In one embodiment, the smart contract may execute a payment from the supplier of the trackable resource to the dealer or seller of the trackable resource. This may be, for example, for marketing, incentive monies, etc. on the trackable resource.

In one embodiment, the smart contract may cause a second trackable resource to be requested from a supplier.

In one embodiment, the smart contract may cause a third party to change title of the trackable resource to a buyer or a second seller.

In one embodiment, the smart contract may cause a third party to insure the trackable resource.

According to another embodiment, in an information processing device comprising at least one computer processor and a distributed ledger system, a method for distributed ledger-based floorplanning may include: (1) receiving, at the distributed ledger system and from a supplier of a trackable resource, an identifier for the trackable resource and resource status data for the trackable resource; (2) writing the resource status data to the distributed ledger; (3) receiving, at the distributed ledger system, a first update to the resource status data for the trackable resource from a dealer or seller of the trackable resource, the first update to the report status indicating that the trackable resource is in the dealer or seller's control; (4) writing the first update to the resource status data to the distributed ledger; (5) receiving, at the distributed ledger system, a second update to the resource status data for the trackable resource from the dealer or seller of the trackable resource, the second update to the report status indicating that the trackable resource has been sold to a third party; (6) writing the second update to the resource status data to the distributed ledger; and (7) executing a smart contract based on the second update to the resource status data.

In one embodiment, the smart contract may execute a payment from the dealer or seller of the trackable resource to the supplier of the trackable resource.

In one embodiment, the smart contract may execute a payment from a financier of the trackable resource to the supplier of the trackable resource.

In one embodiment, the smart contract may cause a second trackable resource to be requested from the supplier.

In one embodiment, the method may further include receiving, at the distributed ledger, a third update to the resource status data for the trackable resource from an on-board system on the trackable resource, the third update comprises a mileage of the trackable resource, a maintenance status of the trackable resource, or a location of the trackable resource; and writing the third update to the resource status data to the distributed ledger.

In one embodiment, the method may further include executing a second smart contract based on the third update to the resource status data. The second smart contract may depreciate the trackable resource.

In one embodiment, the second status update may indicate that the trackable resource has been sold out of trust.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for distributed ledger-based floorplanning are disclosed. Although embodiments are disclosed in the context of automobile floorplanning, it should be recognized that the embodiments disclosed herein may have broad applicability to any resource that may be trackable by a unique identifier, such as by a vehicle identification number, a serial number, a SKU, etc.

Embodiments disclosed herein may provide insight regarding a status of a resource based on the unique identifier without requiring, or by minimizing, manual inspections. Distributed ledgers, such as Blockchain ledgers, may be used to provide a transparent record of the location, diagnostics, and loan/sale status of every resource, thereby mitigating risks from potential miscommunication between dealers, lenders, and OEMs. The distributed ledger may use permissioned data so that the counterparties have visibility to the appropriate information they need to manage the loans and inventory.

In embodiments, telematics information from a vehicle (e.g., vehicle status such as mileage, location, etc. from in-vehicle hardware/software) may be used by the lender to streamline the floorplanning process, reducing time and cost. Counterparties may have access to real-time information on the distributed ledger to reconcile resource status, update a line of credit, and ship inventory. In one embodiment, a separate device may be plugged into a vehicle's OBD-II port in order to collect and transmit this information. In another embodiment, the vehicles in-car computer may provide this information. In another embodiment, Internet of Things ("IoT") devices, sensors, etc. may also gather and/or deliver this information. This information may trigger, for example, real-time adjustments of a loan balance, and to record the location, diagnostics, and loan/sale status of each vehicle.

Embodiments may reduce or eliminate the need for physical audits (e.g., in-person physical counting and reconciliation of in stock and sold inventory), and straight-through reporting of resource status may decrease the number of resources that may be sold out of contract provisions.

Figure 1:
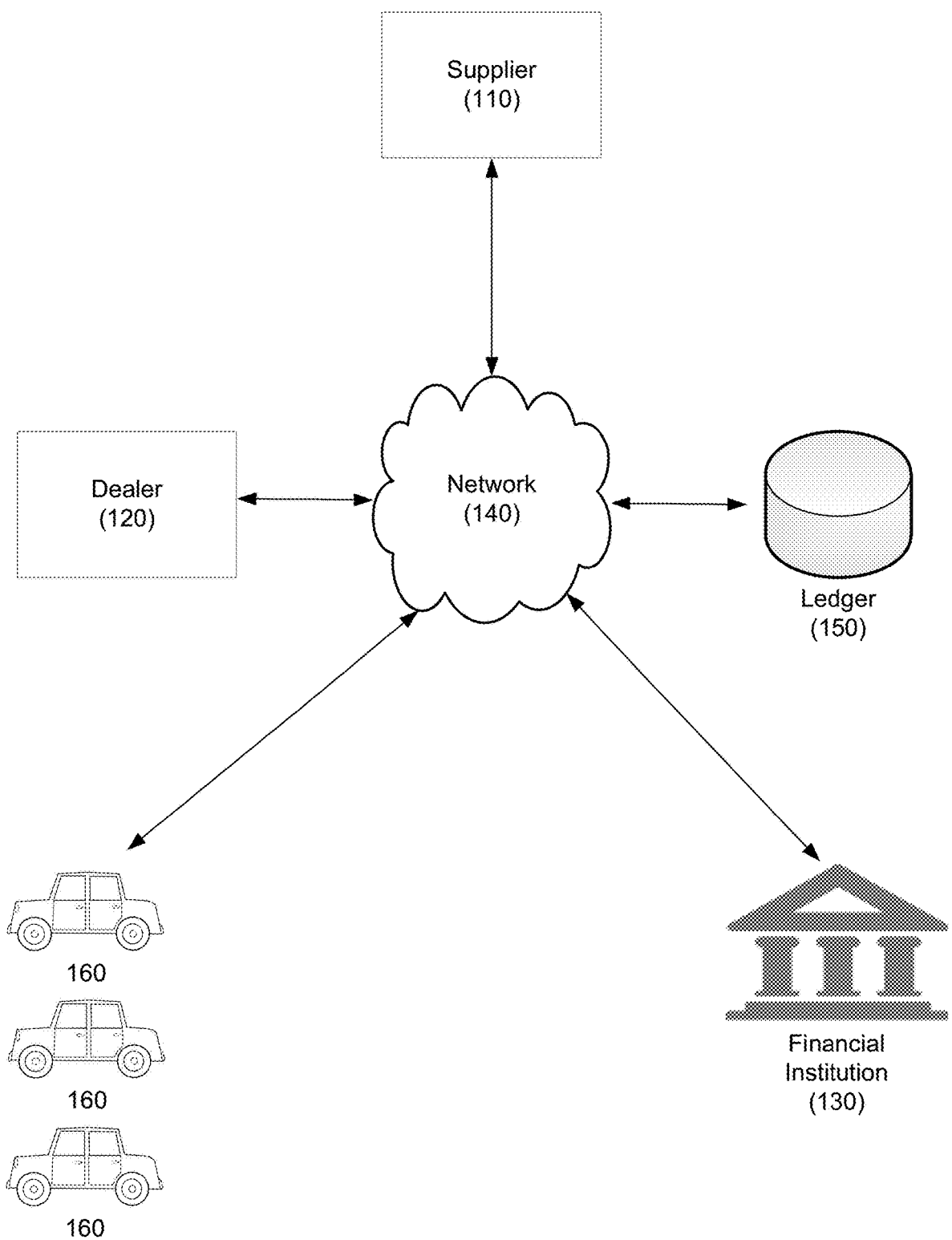
FIG. 1 depicts a system for distributed ledger-based floorplanning according to one embodiment.

Referring to FIG. 1, a system for distributed ledger-based floorplanning is disclosed according to one embodiment. System 100 may include supplier 110 (such as an OEM), dealer or reseller 120, financial institution or lender 130, ledger 150, and one or more resource 160. Supplier 110, dealer or reseller 120, financial institution or lender 130, ledger 150, and one or more resource 160 may communicate using network 140.

In one embodiment, supplier 110 may be a supplier or manufacturer of resource(s) 160. Examples of resources 160 include vehicles, motorcycles, marine vehicles, construction equipment, agricultural equipment, commercial equipment, airplanes, connected appliances, etc. Any suitable trackable resource may be included as is necessary and/or desired. In one embodiment, resource 160 may be tracked or identified using a unique identifier (e.g., a VIN, a serial number, etc.). In one embodiment, resource(s) may be resold by dealer 120.

Dealer 120 may sell, lease, rent, loan, share, service, etc. resource 160 to consumers and/or businesses. In one embodiment, dealer 120 may provide any suitable ancillary service for resource 160 (e.g., insurance, titling, parts, etc.).

In one embodiment, dealer 120 may be associated with supplier 110 (e.g., dealer 120 may be affiliated with, or licensed by, supplier 110); in another embodiment, dealer 120 may be independent of supplier 110.

For example, dealer 120 may an automobile dealer for the brand of automobiles that supplier 110 manufactures or supplies.

In one embodiment, dealer 120 may maintain an inventory of resources 160, such as cars, provided by supplier 110.

In another embodiment, dealer 120's inventory may include resales. For example, in the context of vehicles, dealer 120 may resell used vehicles (e.g., certified pre-owned vehicles, non-certified pre-owned vehicles) that may be financed by financial institution 130.

Financial institution 130 may provide dealer 120 with financing to maintain the inventory of resources 160. Examples of financial institution 130 may include National, Regional, Local Banks, OEM Captive Financial entities, Credit Unions, etc.

Supplier 110, dealer 120, and financial institution 130 may conduct the following exemplary transactions with each other. Financial institution 130 may lend money to dealer 120, and may audit dealer 120's inventory. Dealer 120 may communicate its inventory status to financial institution 130, and may repay the loan as the inventory is sold.

Supplier 110 may send an invoice to financial institution 130 for the inventory of resources 160 that is being financed, and financial institution 130 may pay supplier 110 for the inventory of resources 160.

Dealer 120 may order the inventory of resources 160 from supplier 110, and supplier 110 may provide dealer 120 with the inventory of resources 160.

In one embodiment, resources 160 may supply resource status data. In one embodiment, resources 160 may provide the resource status data directly or indirectly (e.g., via dealer 120, supplier 110, etc.) to ledger 150. For example, resource status data may be provided from onboard sensors via a telematics provider (not shown), from one or sensors near the resource(s) (e.g., in dealer 120's lot), from a connected computing device (e.g., an in-vehicle computer system), from a mobile device, an IoT appliance, etc.

In one embodiment, resource status data may include, for example, a location of the resource (e.g., whether it is at a location for dealer 120, such as on the dealer lot), a status of the resource (e.g., mileage, hours of use, damage status (e.g., deployed airbags), use status (e.g., anything that could negatively impact the resource such as operating a vehicle in a manner outside of guidelines), maintenance status, whether the resource is in dealer 120's inventory or sold, etc. Other example resource statuses may include in-transit, service loaner, demonstrator, rental, fleet vehicle, etc.

Ledger 150 may be a distributed ledger that may be accessed by some or all of supplier 110, dealer 120, financial institution 130, and inventory data 160. In one embodiment, ledger 150 may be an immutable, cryptographically-verifiable ledger, such as a Blockchain-based or Ethereum-based ledger. In one embodiment, each of supplier 110, dealer 120, financial institution 130, and resource(s) 160 may be provided with certain rights to data on ledger 150, such as read access, write access, etc. In one embodiment, each of supplier 110, dealer 120, financial institution 130, and resource(s) 160 may only have rights to access data that is relevant to its transactions.

In one embodiment, a separate GPS system may be used to provide resource location data, which may be written to ledger 150 as resource status data.

In one embodiment, smart contracts may be implemented for flooring terms, repayment of curtailments, payoff of vehicles based on when dealer is funded from retail financing source, payoff on insurance claims, interest payments, etc. For example, a smart contract may be used to order replacement resources 160, cause payment to flow from dealer 120 to financial institution 130, etc. In addition, smart contracts may be used to request and/or fulfill warranty repair claims between supplier 110 and dealer 120, as well as any transactions (e.g., CPO inspections, extended warranty transactions, etc.).

Figure 2:
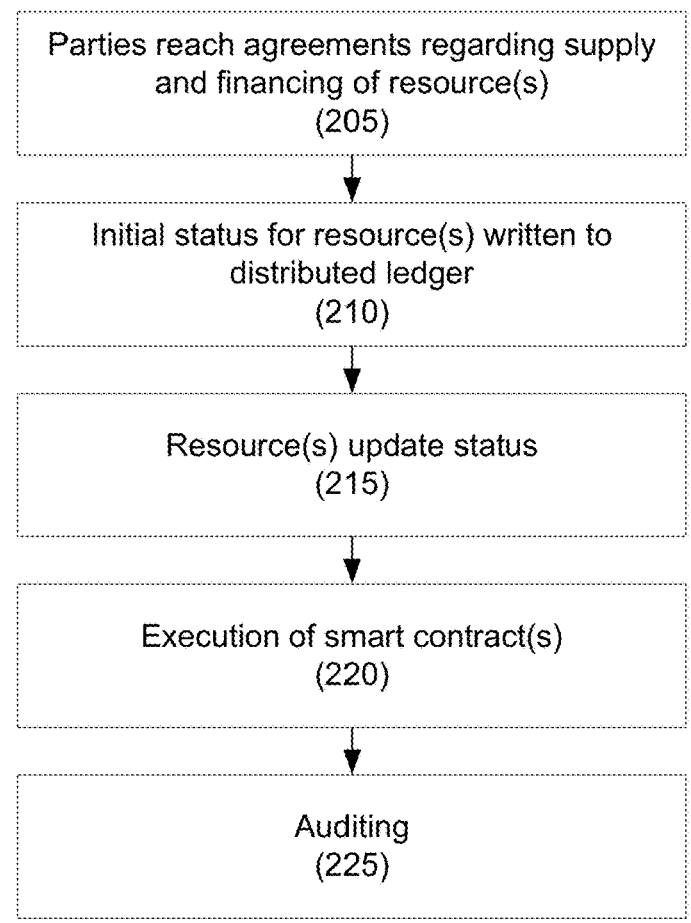
FIG. 2 depicts a process flow for distributed ledger-based floorplanning according to one embodiment.

Referring to FIG. 2, a method for distributed ledger-based floorplanning is disclosed according to one embodiment.

In step 205, a supplier, a dealer, and a financial institution may reach agreements regarding the supply and financing of one or more resource. For example, the supplier may agree to supply the resource(s) to the dealer, the financial institution may agree to lend money to the dealer to pay for the inventory, and the dealer may agree to repay the loan as the resource(s) are sold.

In one embodiment, the contracts may be written to a ledger, such as a Blockchain-based distributed ledger.

In step 210, data for each resource may be written to the ledger along with its status. This may be done when the resource is allocated to the dealer, when the resource leaves the supplier, when the resource is received by the dealer, etc. For example, for a vehicle, the VIN of the resource, the mileage, one or more cost (e.g., dealer price, MSRP, etc.), etc. may be written.

In one embodiment, the supplier may write the resource data to the ledger. In another embodiment, the dealer may write the resource data to the distributed ledger.

Any other information may be provided as is necessary and/or desired.

In step 215, the resource may update its status by providing resource status data, such as location, in inventory/sold, mileage, hours of use, maintenance status, whether or not the resource has been operated outside of guidelines, etc. For example, hardware and/or software associated with the vehicle through, for example, connected car services, may provide certain resource status data. Examples of such hardware and/or software include onboard telematics, OBD-II connectors, on-board computers, etc. The resource status data may be provided periodically (e.g., daily), upon the occurrence of an event (e.g., arrival, sale, departure from the inventory area, return to the inventory area), on demand, or as otherwise necessary and/or desired. The resource status data may be written to the ledger directly, or indirectly (e.g., via the dealer, supplier, etc.).

In another embodiment, external sensors near the resource may receive and/or collect the resource status data. For example, sensors in the dealer's inventory area may collect resource status data and communicate that data to the ledger.

In step 220, upon the occurrence of an event, the ledger may be updated. For example, when the resource is sold, the sale may be written to the ledger. One or more smart contracts may be executed to, for example, cause the dealer to repay the financial institution for the loan, the dealer to order a replacement resource, etc.

As another example, when a resource is sold out of policy and/or trust (i.e., a condition wherein a specific unit of inventory is sold and the corresponding loan provided by the financial institution remains unpaid), a smart contract may cause repayment to the financial institution, or may trigger a sold out of trust event if funds are not available to repay the financial institution. Examples of events include generating an alert for the financial institution, seizing the assert, etc.

As another example, when a resource depreciates in value (e.g., a vehicle is on the lot for a certain amount of time, is damaged, is stolen, etc.), an appropriate smart contract may be executed to address the situation. For example, the smart contract may initiate an insurance claim, may report the status to the financial institution, etc. In another embodiment, the smart contract may initiate the repayment of curtailments, interest, etc.

In one embodiment, additional actions, such as providing resource information to a titling agency (e.g., for the perfection of the lender's security interest) for the state or county, providing resource information to a financial institution for the resource buyer, providing resource information to the resource buyer's insurance company, may be taken as is necessary and/or desired.

For example, a smart contract may transfer ownership of the resource and finance or pay for the resource. For a vehicle, because the VIN may be tracked on the ledger, when the VIN is written with an indication of change of ownership, smart contracts may identify the transfer and may offer financing to the buyer. Consumer credit applications may be written to the ledger, along with the selected financing. Thus, a dealer may write the consumer credit application and the VIN to the ledger, and a financing financial institution and may decision financing based thereon.

In one embodiment, the identifier on the ledger may be used by other counterparties that may be connected and/or have access to the ledger. For example, the inventory's history (e.g., maintenance, recalls, incidents, etc.) may be written to the ledger. The resource's history may be helpful to dealers understanding CPO eligibility, in remarketing, marketing, etc. It may be helpful for the consumer to understand the resource's history. It may be helpful to a financing financial institution for loyalty, to identify clean/low-mileage cars, etc.

In step 225, any of the parties may audit another party. For example, the financial institution may audit the dealer by accessing the ledger and determining a status of the resources that it has financed. In one embodiment, automated reporting may be provided. For example, suppliers may audit dealers for warranty work, recalls, repairs, titling, indirect loans, insurance, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the ANDROID operating system, the Microsoft WINDOWS™ operating systems, the UNIX operating system, the LINUX operating system, the XENIX operating system, the IBM AIX™ operating system, the Hewlett-Packard UX™ operating system, the Novell NETWARE™ operating system, the Sun Microsystems SOLARIS™ operating system, the OS/2™ operating system, the BeOS™ operating system, the MACINTOSH operating system, the APACHE operating system, an OPENSTEP™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for distributed ledger-based inventory floor-planning, comprising:
   in an information processing device comprising at least one computer processor and a distributed ledger system:
      receiving, at the distributed ledger system, an identifier for a vehicle and a sales status for the vehicle, the vehicle being in an inventory of a plurality of vehicles for a dealer of the vehicle that are offered for sale or for lease by the dealer, wherein the vehicle is financed by a supplier of the vehicle or a financier while the vehicle is in inventory;
      writing the identifier and the vehicle sales status to a distributed ledger;
      receiving, at the distributed ledger, an update to the vehicle sales status for the vehicle, the update indicating that the vehicle has been taken out of the inventory of the plurality of vehicles;
      writing the update to the distributed ledger; and
      executing a smart contract based on the update to the vehicle sales status, wherein the smart contract executes a payment from the dealer of the vehicle to the supplier or the financier that financed the vehicle for the dealer.

2. The method of claim 1, wherein the vehicle sales status or the update to the vehicle sales status is received from the supplier of the vehicle.

3. The method of claim 1, wherein the vehicle sales status or the update to the vehicle sales status is received by the dealer of the vehicle.

4. The method of claim 1, wherein the identifier comprises a vehicle identification number.

5. The method of claim 4, wherein the vehicle sales status or the update to the vehicle sales status is received from an onboard system for the vehicle.

6. The method of claim 4, wherein the vehicle sales status or the update to the vehicle sales status is received from a telematics provider for the vehicle.

7. The method of claim 4, wherein the vehicle sales status or the update to the vehicle sales status is received from a sensor at a location for the dealer of the vehicle.

8. The method of claim 4, wherein the vehicle sales status further comprises a mileage of the vehicle, and/or a maintenance status of the vehicle.

9. The method of claim 1, wherein the smart contract further causes a second vehicle to be requested from the supplier.

10. The method of claim 1, wherein the smart contract further causes a third party to change title of the vehicle to a buyer or a second seller.

11. The method of claim 1, wherein the smart contract further causes a third party to insure the vehicle.

12. A method for distributed ledger-based inventory floor-planning, comprising:
   in an information processing device comprising at least one computer processor and a distributed ledger system:
      receiving, at the distributed ledger system and from a supplier of a vehicle, an identifier for the vehicle and a sales status for the vehicle, the vehicle being in an inventory of a plurality of vehicles for a dealer of the vehicle that are offered for sale or for lease by the dealer, wherein the vehicle is financed by the supplier of the vehicle or a financier while the vehicle is in inventory;

writing the sales status to the distributed ledger;

receiving, at the distributed ledger system, a first update to the sales status for the vehicle from the dealer or seller of the vehicle, the first update to the sales status indicating that the vehicle is in the dealer or seller's inventory of the plurality of vehicles;

writing the first update to the sales status to the distributed ledger;

receiving, at the distributed ledger system, a second update to the sales status for the vehicle from the dealer or seller of the vehicle, the second update to the sales status indicating that the vehicle has been sold to a third party and is no longer in the inventory of the plurality of vehicles;

writing the second update to the sales status to the distributed ledger; and executing a smart contract based on the second update to the sales status, wherein the smart contract executes a payment from the dealer of the vehicle to the supplier or the financier that financed the vehicle for the dealer.

13. The method of claim 12, wherein the smart contract further causes a second vehicle to be requested from the supplier.

14. The method of claim 12, further comprising:

receiving, at the distributed ledger, a third update to the sales status for the vehicle from an on-board system on the vehicle, the third update comprises a mileage of the vehicle, a maintenance status of the vehicle, or a location of the vehicle; and writing the third update to the sales status to the distributed ledger.

15. The method of claim 14, further comprising:

executing a second smart contract based on the third update to the sales status;

wherein the second smart contract depreciates the vehicle.

\* \* \* \* \*